United States Patent [19]

Jin et al.

[11] 4,340,434

[45] Jul. 20, 1982

[54] HIGH REMANENCE FE-MO-NI ALLOYS FOR MAGNETICALLY ACTUATED DEVICES

[75] Inventors: Sungho Jin, Gillette; Thomas H. Tiefel, Rockaway, both of N.J.

[73] Assignee: Bell Telephone Laboratories, Incorporated, Murray Hill, N.J.

[21] Appl. No.: 178,832

[22] Filed: Aug. 18, 1980

[51] Int. Cl.[3] .............................................. C04B 35/00

[52] U.S. Cl. .............................. 148/31.55; 148/31.57; 148/101; 148/120

[58] Field of Search .................. 148/31.55, 31.57, 101, 148/102, 120, 121; 75/123 N, 123 K, 123 J

[56] References Cited

U.S. PATENT DOCUMENTS

| | | | |
|---|---|---|---|
| 2,707,680 | 5/1955 | Succop | 75/123 J |
| 3,624,568 | 11/1971 | Olsen et al. | 335/153 |
| 3,805,378 | 4/1974 | Archer et al. | 29/622 |
| 3,971,676 | 7/1976 | Detert et al. | 75/123 K |
| 4,128,420 | 12/1978 | Esper et al. | 75/123 K |
| 4,162,157 | 7/1979 | Parker et al. | 75/123 J |

OTHER PUBLICATIONS

L. R. Moskowitz, *Permanent Magnet Design and Application Handbook,* Cahners Books, 1976, pp. 211–220.

M. R. Pinnel, "Magnetic Materials for Dry Reed Contacts", *IEEE Transactions on Magnetics,* vol. MAG-12, No. 6, Nov. 1976, pp. 789–794.

R. M. Bozorth, *Ferromagnetism,* Van Nostrand, 1959, pp. 34–37, 236–238 and 417.

W. S. Messkin et al., "Experimentelle Nachprufung der Akulovschen Theorie der Koerzitivkraft", *Zeitschrift fur Physik,* vol. 98, (1936), pp. 610–623.

H. Matsumoto et al., "Characteristics of Fe–Mo and Fe–W Semihard Magnet Alloys," *Journal of the Japanese Institute of Metals,* vol. 43, (1979), pp. 506–512.

K. S. Seljesater et al., "Magnetic and Mechanical Hardness of Dispersion Hardened Iron Alloys", *Trans. of the Am. Soc. for Steel Treating,* vol. 19, pp. 553–576.

W. Koster, "Das System Eisen-Nickel-Molybdan", *Archiv fur das Eisenhuttenwesen,* vol. 8, No. 4, (Oct. 1934), pp. 169–171.

Metals Handbook, American Society for Metals, vol. 8, p. 431.

*Primary Examiner*—John P. Sheehan
*Attorney, Agent, or Firm*—Peter A. Businger

[57] ABSTRACT

Magnetically actuated devices such as, e.g., switches and synchronizers typically comprise a magnetically semihard component having a square B—H hysteresis loop and high remanent induction. Among alloys having such properties are Co—Fe—V, Co—Fe—Nb, and Co—Fe—Ni—Al—Ti alloys which, however, contain undesirably large amounts of cobalt.

According to the invention, devices are equipped with a magnetically semihard, high-remanence Fe—Mo—Ni alloy which comprises Mo in a preferred amount in the range of 2–26 weight percent and Ni in a preferred amount in the range of 0.5–15 weight percent.

Magnets made from alloys of the invention may be shaped, e.g., by cold drawing, rolling, bending, or flattening and may be used in devices such as, e.g., electrical contact switches, hysteresis motors, and other magnetically actuated devices.

Preparation of alloys of the invention may be by a treatment of annealing and aging or deformation and aging.

3 Claims, 3 Drawing Figures

HIGH REMANENCE FE-MO-NI ALLOYS FOR MAGNETICALLY ACTUATED DEVICES

TECHNICAL FIELD

The invention is concerned with magnetic devices and materials.

BACKGROUND OF THE INVENTION

Magnetically actuated devices may be designed for a variety of purposes such as, e.g., electrical switching, position sensing, synchronization, flow measurement, and stirring. Particularly important among such devices are so-called reed switches as described, e.g., in the book by L. R. Moskowitz, *Permanent Magnet Design and Application Handbook,* Cahners Books, 1976, pp. 211–220; in U.S. Pat. No. 3,624,568, issued Nov. 30, 1971 to K. M. Olsen et al.; in U.S. Pat. No. 3,805,378, issued Apr. 23, 1974 to W. E. Archer et al.; and in the paper by M. R. Pinnel, "Magnetic Materials for Dry Reed Contacts", *IEEE Transactions on Magnetics,* Vol. MAG-12, No. 6, November 1976, pp. 789–794. Reed switches comprise flexible metallic reeds which are made of a material having semihard magnetic properties as characterized by an essentially square B—H hysteresis loop and high remanent induction $B_r$; during operation reeds bend elastically so as to make or break electrical contact in response to changes in a magnetic field.

Among established alloys having semihard magnetic properties are Co—Fe—V alloys known as Vicalloy and Remendur, Co—Fe—Nb alloys known as Nibcolloy, and Co—Fe—Ni—Al—Ti alloys known as Vacozet. These alloys possess adequate magnetic properties; however, they contain substantial amounts of cobalt whose rising cost in world markets causes concern. Moreover, high cobalt alloys tend to be brittle, i.e., to lack sufficient cold formability for shaping, e.g., by cold drawing, rolling, bending, or flattening.

Relevant with respect to the invention are the book by R. M. Bozorth, *Ferromagnetism,* Van Nostrand, 1959, pp. 34–37, pp. 236–238, and p. 417; the paper by W. S. Messkin et al., "Experimentelle Nachprufung der Akulovschen Theorie der Koerzitivkraft", *Zeitschrift fur Physik,* Vol. 98 (1936), pp. 610–623; the paper by H. Masumoto et al., "Characteristics of Fe-Mo and Fe-W Semihard Magnet Alloys", *Journal of the Japanese Institute of Metals,* Vol. 43 (1979), pp. 506–512; and the paper by K. S. Seljesater et al., "Magnetic and Mechanical Hardness of Dispersion Hardened Iron Alloys", *Transactions of the American Society for Steel Treating,* Vol. 19, pp. 553–576. These references are concerned with Fe-Mo binary alloys, their preparation, and their mechanical and magnetic properties. Phase diagrams of Fe—Mo—Ni ternary alloys appear in W. Koster, "Das System Eisen-Nickel-Molybdan", *Archiv fur das Eisenhuttenwesen,* Vol. 8, No. 4 (October 1934), pp. 169–171 and in *Metals Handbook,* American Society for Metals, Vol. 8, p. 431.

SUMMARY OF THE INVENTION

High remanence, square (BH)-loop, semihard magnetic properties are realized in Fe—Mo—Ni alloys which preferably comprise Fe, Mo, and Ni in a combined amount of at least 99.5 weight percent, Mo in an amount in the range of 2–26 weight percent of such combined amount, and Ni in an amount in the range of 0.5–15 weight percent of such combined amount. Alloys of the invention are magnetically anisotropic and typically exhibit single phase or multiphase microstructure and crystallographic texture.

Magnets made of such alloys may be shaped, e.g., by cold drawing, rolling, bending, or flattening and may be used in devices such as, e.g., electrical contact switches, hysteresis motors, and other magnetically actuated devices.

Preparation of alloys of the invention may comprise uniaxial deformation and aging. Aging is preferably carried out at a temperature at which an alloy is in a two-phase or multiphase state.

DETAILED DESCRIPTION

Figure 1:
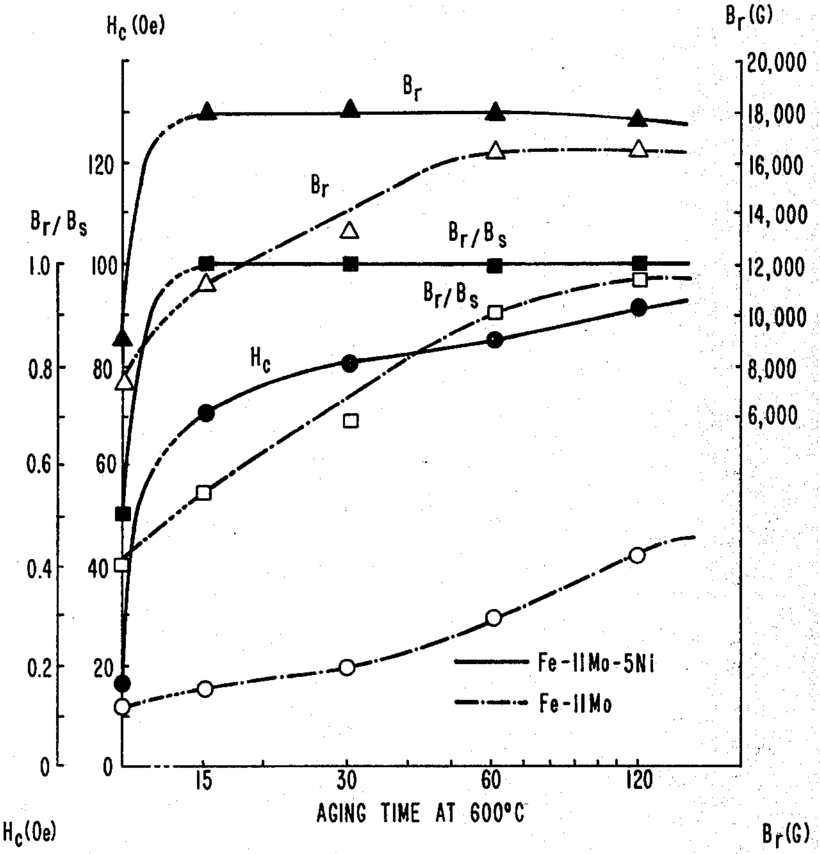
FIG. 1 shows magnetic properties of an Fe—11Mo—5Ni alloy according to the invention as a function of aging time as compared with magnetic properties of an Fe—11Mo prior art alloy.

Magnetically actuated devices may be conveniently characterized in that they comprise a component whose position is dependent on strength, direction, or presence of a magnetic field, and further in that they comprise means such as, e.g., an electrical contact for sensing the position of such component.

Semihard magnet properties are conveniently defined as remanent magnetic induction, $B_r$, greater than 7000 gauss, coercive force, $H_c$, greater than 1 oersted, and squareness ratio, $B_r/B_s$, greater than 0.7.

Particularly suited for use in magnetically actuated devices are materials which have magnetic remanence greater than or equal to 13000 gauss and magnetic squareness greater than or equal to 0.9; such materials may be said to have high remanance, square loop, semihard magnet properties.

In accordance with the invention, it has been realized that Fe—Mo—Ni alloys which preferably comprise Fe, Mo, and Ni in a combined amount of at least 99.5 weight percent, Mo in an amount in the range of 2–26 weight percent of such combined amount, and Ni in an amount in the range of 0.5–15 weight percent of such combined amount, can be produced to have desirable high remanence, square loop, semihard magnet properties. More narrow preferred ranges are 5–22 weight percent Mo and 0.8–15 weight percent Ni. Alloys of the invention may comprise small amounts of additives such as, e.g., Cr for the sake of enhanced corrosion resistance, or Co for the sake of enhanced magnetic properties. Other elements such as, e.g., Si, Al, Cu, V, Ti, Nb, Zr, Ta, Hf, and W may be present as impurities in individual amounts preferably less than 0.2 weight percent and in a combined amount preferably less than 0.5 weight percent. Similarly, elements C, N, S, P, B, H, and O are preferably kept below 0.1 weight percent individually and below 0.5 weight percent in combination. Minimization of impurities is in the interest of maintaining alloy formability, e.g. for development of anisotropic structure as well as for shaping into desired form. Excessive amounts of elements mentioned may interfere with texture formation, thereby lowering magnetic properties.

Magnetic alloys of the invention possess anisotropic, single phase or multiphase grain and microstructure.

Anisotropic particles and grains have preferred aspect ratio of at least 8 and preferably at least 30. Aspect ratio may be conveniently defined as length-to-diameter ratio when deformation is uniaxial such as, e.g., by wire drawing, and as length-to-thickness ratio when deformation is planar such as, e.g., by rolling. Squareness ratio, $B_r/B_s$, of alloys of the invention is typically greater than or equal to 0.9, magnetic coercivity is in the range of 1-500 oersted, and magnetic remanence is in the range of 13000-19000 gauss.

Alloys of the invention may be prepared, e.g., by casting from a melt of constituent elements Fe, Mo, and Ni in a crucible or furnace such as, e.g., an induction furnace; alternatively, a metallic body having a composition within the specified range may be prepared by powder metallurgy. Preparation of an alloy and, in particular, preparation by casting from a melt calls for care to guard against inclusion of excessive amounts of impurities as may originate from raw materials, from the furnace, or from the atmosphere above the melt. To minimize oxidation or excessive inclusion of nitrogen, it is desirable to prepare a melt with slag protection, in a vacuum, or in an inert atmosphere.

Cast ingots of an alloy of the invention may typically be processed by hot working, cold working, and solution annealing for purposes such as, e.g., homogenization, grain refining, shaping, or the development of desirable mechanical properties.

According to the invention, alloy structure is magnetically anisotropic. Preferred aging temperatures are in a range of 500-800 degrees C., and aging times are typically in a range of 5 minutes to 10 hours. If cold forming after aging is desired, cooling from aging temperature should preferably be rapid as, e.g., by quenching at a rate sufficient to minimize uncontrolled precipitation. Among benefits of such aging heat treatment is enhancement of coercive force, $H_c$, and squareness, $B_r/B_s$, of the B—H loop as may be due to one or several of metallurgical effects such as, e.g., formation of precipitates such as, e.g., Mo—Ni, Mo—Fe, or Mo—Ni—Fe phases or multiphase decomposition such as, e.g., into alpha plus gamma.

Processing to achieve desirable anisotropic structure may be by various combinations of sequential processing steps. A particularly effective processing sequence comprises (1) annealing at a temperature in a range of 800-1250 degrees C. corresponding to a predominantly alpha, alpha plus gamma, or gamma phase, (2) rapid cooling, (3) cold deformation, e.g., by drawing, swaging, or rolling for texture formation, and (4) aging at a temperature in a preferred range of approximately 500-800 degrees C. and for times in a typical range of approximately 5 minutes to 10 hours. Aging may have the effect of inducing single phase or multiphase structure of alpha plus precipitate $(Fe,Ni)_3Mo_2$, alpha plus alpha prime plus precipitate, or alpha plus gamma plus precipitate.

Deformation in step (3) may be at room temperature or at any temperature in the general range of $-196$ degrees C. (the temperature of liquid nitrogen) to 600 degrees C. If deformation is carried out at a temperature above room temperature, the alloy may subsequently be air cooled or water quenched. Deformation results in preferred cross-sectional area reduction of at least 80 percent and preferably at least 95 percent. Such deformation may serve several purposes and, in particular, may help to develop texture. Also, deformation may serve to enhance kinetics of subsequent aging in a two-phase or multiphase range. Ductility adequate for deformation may be assured by limiting the presence of impurities and, in particular, of elements of groups **4*b* and 5*b*** of the periodic table such as Ti, Zr, Hf, V, Nb, and Ta.

Ultimate magnetic properties of an alloy depend on aging time as well as on amount of deformation. Dependence on aging time is illustrated by FIG. 1 which also provides for a comparison of an alloy of the invention with a prior art alloy. In particular, FIG. 1 shows dependence of coercive force, $H_c$, remanent magnetization, $B_r$, and magnetic squareness ratio, $B_r/B_s$, as a function of aging time for an Fe—11Mo—5Ni alloy of the invention and an Fe—11Mo prior art alloy. Aging time is on a logarithmic scale.

Figure 2:
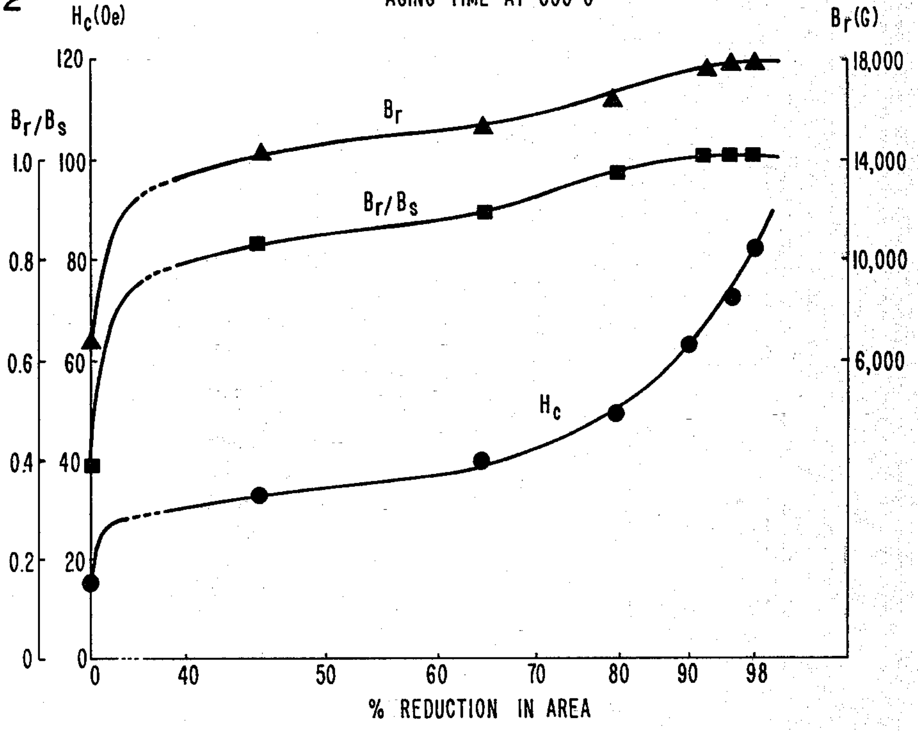
FIG. 2 shows magnetic properties of an Fe—11Mo—5Ni alloy according to the invention as a function of percent reduction in cross-sectional area.

Dependence of coercive force, remanent magnetization, and magnetic squareness as a function of percent reduction are shown in FIG. 2.

Alloys of the invention remain highly ductile even after severe deformation such as, e.g., by cold drawing resulting in 95 percent area reduction. Such deformed alloys may be further shaped, e.g., by bending or flattening without risk of splitting or cracking. Bending may produce a change of direction of up to 30 degrees with a bend radius not exceeding thickness. For bending through larger angles, safe bend radius may increase linearly to a value of 4 times thickness for a change of direction of 90 degrees. Flattening may produce a change of width-to-thickness ratio of at least a factor of 2.

Figure 3:
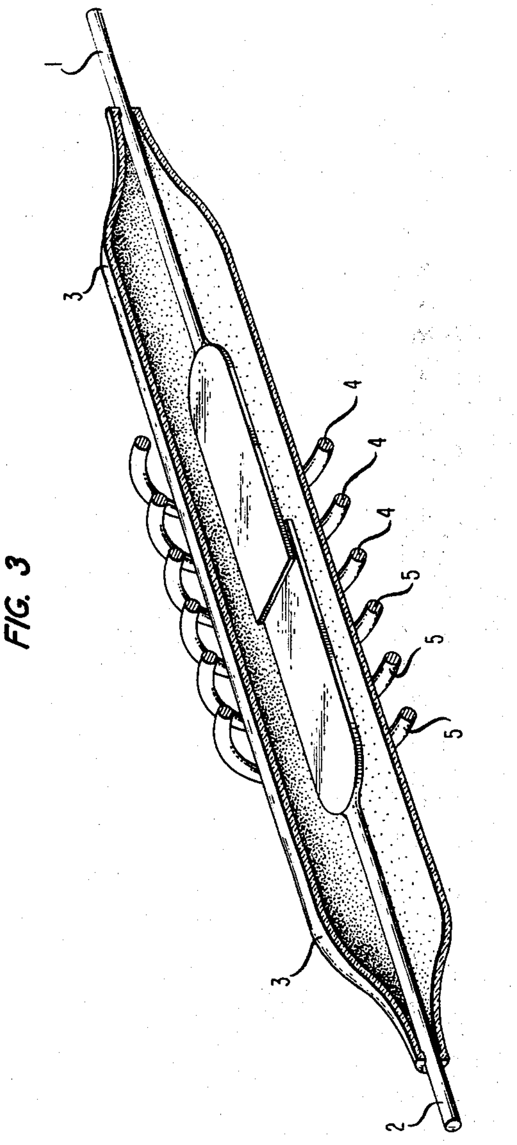
FIG. 3 shows a reed switch assembly comprising Fe—Mo—Ni reeds according to the invention.

High formability in the wire-drawn state is of particular advantage in the manufacture of devices such as reed switches exemplified in FIG. 3 which shows flattened reeds 1 and 2 made of an Fe—Mo—Ni alloy and extending through glass encapsulation 3 which is inside magnetic coils 4 and 5.

In addition to being readily cold formable, alloys of the invention are also highly ductile as is desirable for ease of handling of encapsulated switch assemblies. In particular, reed portions exposed to strain may bend, leaving a glass-to-reed seal intact. Alloys of the invention are sufficiently ductile to allow bending through an angle of 30 degrees when bend radius equals article thickness. Formability and ductility are enhanced by minimization of the presence of impurities and, in particular, of elements of groups 4 and **5*b*** of the periodic table.

Among desirable properties of Fe—Mo—Mi semihard magnetic alloys are the following: (1) high magnetic squareness as is desirable in switching and other magnetically actuated devices, (2) abundant availability of constituent elements Fe, Mo, and Ni, (3) ease of processing and forming due to high formability and ductility, both before and after aging, (4) low magnetostriction as may be specified by a saturation magnetostriction coefficient not exceeding $10\times10^{-6}$ and preferably not exceeding $5\times10^{-6}$ as may be desirable, e.g., to minimize sticking of reed contacts, (5) ease of plating with contact metal such as, e.g., gold, and (6) ease of sealing to glass as customarily used to encapsulate reed switches.

Preparation of Fe—Mo—Ni semihard magnets according to the invention is illustrated by the following examples. Corresponding magnetic properties are shown in Table 1.

EXAMPLE 1

An Fe—18Mo—5Ni alloy was homogenized, wire drawn from 68 mil to 20 mil (resulting in an area reduction of 90 percent), and aged at a temperature of 610 degrees C. for 3.5 hours.

EXAMPLE 2

An Fe—18Mo—9Ni alloy was homogenized, wire drawn from 68 mil to 20 mil, and aged at a temperature of 610 degrees C. for 3.5 hours.

EXAMPLE 3

An Fe—11Mo—5Ni alloy was homogenized, wire drawn from 68 mil to 15 mil, and aged at a temperature of 650 degrees C. for 25 minutes.

EXAMPLE 4

An Fe—9Mo—2Ni alloy was homogenized, wire drawn from 68 mil to 15 mil, and aged at a temperature of 650 degrees C. for 90 minutes.

EXAMPLE 5

An Fe—7Mo—5Ni alloy was homogenized, wire drawn from 68 mil to 15 mil, and aged at a temperature of 650 degrees C. for 25 minutes.

EXAMPLE 6

An Fe—7Mo—1Ni alloy was homogenized, wire drawn from 210 mil to 21 mil (resulting in 99 percent area reduction), and aged at a temperature of 670 degrees C. for 80 minutes.

TABLE 1

| Example | $B_r$ gauss | $B_r/B_s$ | $H_c$ oersted |
|---|---|---|---|
| 1 | 13140 | 0.97 | 130 |
| 2 | 13050 | 0.95 | 135 |
| 3 | 17730 | 1 | 87 |
| 4 | 17580 | 0.96 | 42 |
| 5 | 19200 | 0.97 | 30 |
| 6 | 17500 | 0.92 | 32 |

We claim:

1. Magnetic alloy consisting essentially of an amount of at least 99.5 weight percent Fe, Mo, and Ni, Mo being in the range of 2-26 weight percent of said amount, Ni being in the range of 0.5-15 weight percent of said amount, said alloy having magnetic squareness ratio greater than or equal to 0.9, and said alloy having remanence greater than or equal to 13000 gauss.

2. Magnetic alloy of claim 1 having anisotropic two-phase or multiphase microstructure and anisotropic grain structure, particle aspect ratio in said microstructure being greater than or equal to 8.

3. Magnetic alloy of claim 2 in which said aspect ratio is greater than or equal to 30.

* * * * *